(12) United States Patent
Hollis (10) Patent No.: US 7,690,397 B2
(45) Date of Patent: Apr. 6, 2010

(54) DIGITAL ROTARY CONTROL VALVE

(76) Inventor: Thomas J. Hollis, 5 Roxbury Dr., Medford, NJ (US) 08055

( * ) Notice: Subject to any disclaimer, the term of this patent is extended or adjusted under 35 U.S.C. 154(b) by 255 days.

(21) Appl. No.: 11/434,333

(22) Filed: May 15, 2006

(65) Prior Publication Data

US 2007/0261745 A1 Nov. 15, 2007

(51) Int. Cl.
*F16K 11/085* (2006.01)
(52) U.S. Cl. ............... 137/625.47; 251/209; 251/310
(58) Field of Classification Search ............ 137/625.11, 137/625.3, 625.31, 625.32, 625.47, 876; 251/118, 129.11, 209, 310
See application file for complete search history.

(56) References Cited

U.S. PATENT DOCUMENTS

| 477,720 | A | * | 6/1892 | Weber ................... 251/283 |
|---|---|---|---|---|
| 2,497,139 | A | * | 2/1950 | Rumbaugh ................ 137/312 |
| 2,621,886 | A | * | 12/1952 | Mueller ................. 137/625.47 |
| 2,973,181 | A | * | 2/1961 | Johnson .................. 251/310 |
| 3,506,239 | A | * | 4/1970 | Johnson .................. 251/310 |
| RE30,224 | E | * | 3/1980 | Ortega ................. 137/625.47 |
| 4,398,562 | A | * | 8/1983 | Saarem et al. ......... 137/625.47 |
| 4,449,692 | A | * | 5/1984 | Rhodes ................... 251/144 |
| 4,628,962 | A | * | 12/1986 | Pezzarossi ............. 137/625.47 |
| 4,711,272 | A | * | 12/1987 | Wiseman ............... 137/625.47 |
| 5,181,540 | A | * | 1/1993 | Campau ................ 137/625.46 |
| 5,379,801 | A | * | 1/1995 | Reinhart et al. ............. 137/876 |
| 6,688,333 | B2 | | 2/2004 | McLane et al. ......... 137/625.11 |
| 6,799,631 | B2 | | 10/2004 | Acre .......................... 165/297 |
| 6,923,211 | B2 | | 8/2005 | McLane et al. ......... 137/625.47 |
| 2004/0163720 | A1 | * | 8/2004 | Joung .................... 137/625.47 |
| 2005/0034851 | A1 | | 2/2005 | Acre .......................... 165/297 |
| 2005/0126517 | A1 | | 6/2005 | Piccirilli et al. .......... 123/41.09 |
| 2006/0005789 | A1 | | 1/2006 | Miura et al. ............... 123/41.1 |

OTHER PUBLICATIONS

Krause, Wolfgang et al. Dynamic Control of the Coolant Temperature for a Reduction of Fuel Consumption and Hydrocarbon Emission. *Society of Automotive Engineers, Inc.*, [960271], pp. 41-50 (1996).

* cited by examiner

*Primary Examiner*—John Fox
(74) *Attorney, Agent, or Firm*—Drinker Biddle & Reath LLP (57) ABSTRACT

A valve includes a body having an interior and defining at least one inlet passageway and discharge passageway. The valve also includes a flow diverter disposed within the body between the inlet and discharge passageways to receive a fluid from the inlet passageway in an inlet direction. The diverter is adapted to discharge the fluid to at least one discharge passageway in a direction that differs from the inlet direction. The diverter is rotatable to vary the discharge direction. According to one embodiment, the discharge direction is substantially perpendicular to the inlet direction.

22 Claims, 10 Drawing Sheets

FIG. 19

DIGITAL ROTARY CONTROL VALVE

FIELD OF THE INVENTION

The present invention relates generally to valves and, more particularly to a valve having a rotatable flow diverter for directing flow of a fluid through the valve.

BACKGROUND OF THE INVENTION

Conventional engine coolant systems for automobile engines incorporate thermostats having expansion elements for controlling flow of an engine coolant to a radiator of the coolant system. The thermostat expansion element is adapted to shift from a closed condition to an opened condition when the coolant temperature reaches an operating temperature range for controlling flow of the coolant between a bypass line and the radiator. In the closed condition, the thermostat is adapted to direct all of the coolant to the bypass line. This enables the coolant to warm up more quickly. When the coolant has been warmed to the temperature range, the thermostat opens allowing coolant to be directed to the radiator via the radiator line.

Engine coolant systems also include electronically controlled valves for directing coolant between an inlet to the valve and two or more outlets from the valve. For example, one known valve directs flow from an inlet line to one or more of three outlets respectively connected to a radiator line, a bypass line and a heating line. The valve directs the flow of the engine coolant to the outlets depending on a rotational position of a disc-like blocking element located within the interior of a valve body.

SUMMARY OF THE INVENTION

According to one aspect of the present invention, a valve comprises a body having an interior defining an inlet passageway and at least two discharge passageways. The valve also comprises a flow diverter having an interior and disposed within the interior of the body between the inlet passageway and the discharge passageways. The flow diverter is adapted to receive a flow of a fluid within the interior of the flow diverter from the inlet passageway in an inlet direction. The flow diverter is adapted to discharge at least a portion of the flow into one of the discharge passageways from the interior of the flow diverter in a discharge direction that is different from the inlet direction. The flow diverter is rotatable with respect to the body about a central axis of the flow diverter to vary the discharge direction for the at least a portion of the flow of the fluid. The valve also comprises a motor coupled to the flow diverter for drivingly rotating the flow diverter with respect to the body.

According to one embodiment of the invention, the body includes a main junction having a substantially cylindrical wall defining an interior located between the inlet passageway and the discharge passageways. The flow diverter includes a substantially cylindrical wall rotatably received within the interior of the main junction of the body. The body of the valve includes a flange located at an end of the main junction and a closure plate received by a recessed shoulder defined by the flange to enclose the flow diverter within the interior of the main junction of the body.

According to one embodiment, the valve includes a first discharge passageway and a second discharge passageway and the flow diverter is rotatable between first and second flow positions. The passageways and the flow diverter are arranged such that the flow diverter directs substantially all of the fluid from the interior of the flow diverter into the first passageway when the flow diverter is in the first flow position and directs substantially all of the fluid from the interior of the flow diverter into the second passageway when the flow diverter is in the second flow position. The flow diverter includes a substantially cylindrical wall and defines a discharge opening extending around approximately one-half of a circumference of the cylindrical wall. The flow diverter is rotatable through an angle of approximately 150 degrees between the first and second flow positions.

According to another aspect of the invention, a valve comprises a body having an interior defining an inlet passageway and at least two discharge passageways. The valve also comprises a flow diverter defining an interior and disposed within the interior of the body between the inlet passageway and the discharge passageways. The flow diverter is adapted to receive a flow of a fluid within the interior of the flow diverter from the inlet passageway in an inlet direction. The flow diverter is adapted to discharge at least a portion of the flow of the fluid into one of the discharge passageways from the interior of the flow diverter in a discharge direction that is substantially perpendicular to the inlet direction. The flow diverter is rotatable with respect to the body about an axis of rotation of the flow diverter to vary the discharge direction for the at least a portion of the flow of the fluid.

According to another aspect of the invention, a valve comprises a body defining an interior having at least one inlet passageway and at least discharge passageway and a flow-controlling diverter disposed within the interior of the body between the at least one inlet passageway and the at least one discharge passageway. The diverter is adapted to receive a flow of fluid within the interior of the diverter from at least one of the inlet passageways in an inlet direction. The diverter is adapted to discharge the fluid from the interior of the diverter to at least one of the discharge passages in a discharge direction substantially perpendicular to the inlet direction.

BRIEF DESCRIPTION OF THE DRAWINGS

For the purpose of illustrating the invention, the drawings show a form of the invention that is presently preferred. However, it should be understood that this invention is not limited to the precise arrangements and instrumentalities shown in the drawings.

DESCRIPTION OF THE INVENTION

Figure 1:
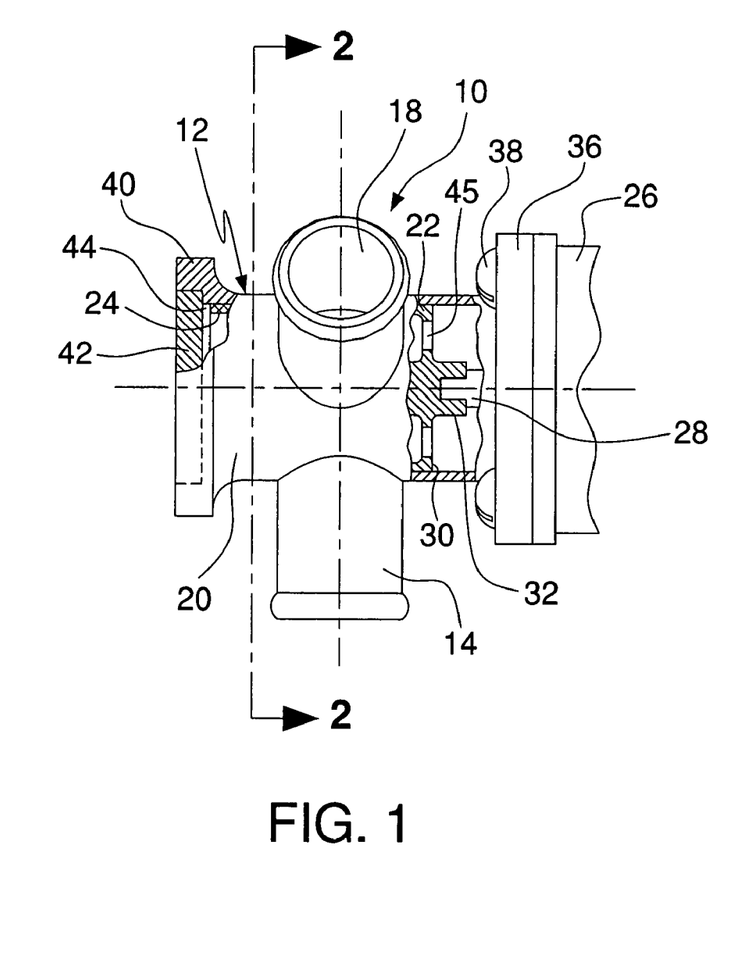
FIG. 1 is a side elevation view, partly in section, of a valve according to an exemplary embodiment of the invention.
Figure 2:
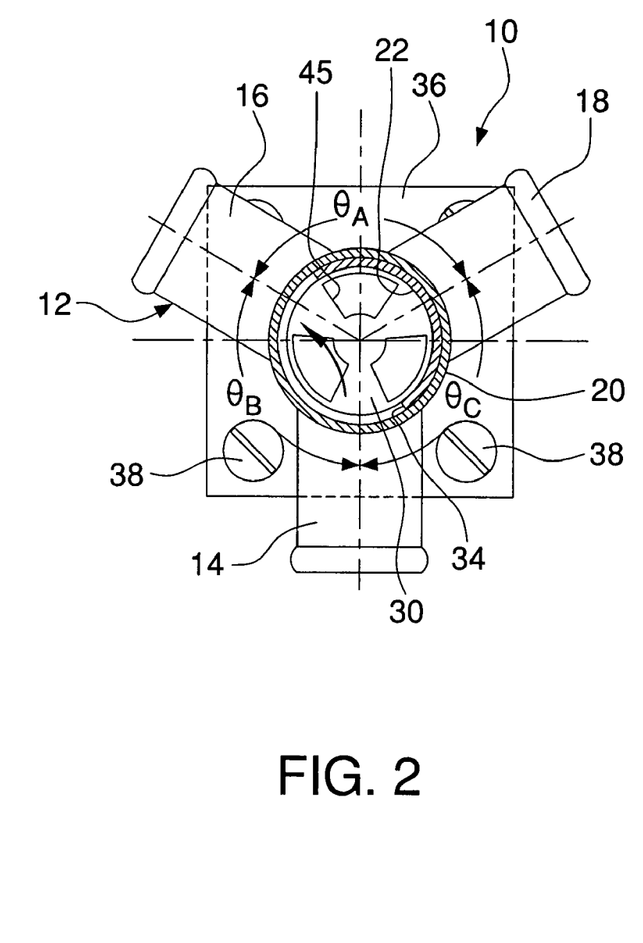
FIG. 2 is a sectional view of the valve of FIG. 1 taken along the line 2-2 in FIG. 1.

Referring to the drawings, where like numerals identify like elements, there is illustrated in FIGS. 1 and 2 a valve 10 according to an exemplary embodiment of the invention. The valve 10 includes a body 12 defining an interior for receiving a fluid, such as a coolant for an engine of an automobile for example. The body 12 includes an inlet 14 defining an inlet passageway and first and second outlets 16, 18 defining outlet passageways. The body 12 also includes a main junction 20 to which each of the inlet 14 and the first and second outlets 16, 18 is connected such that an interior defined by the main junction 20 communicates in common fashion with each interiors of each of the inlet 14 and the outlets 16, 18. As shown, the inlet 14 and the outlets 16, 18 of the depicted valve body 12 are tubular in form defining substantially cylindrical interiors. The interior of the main junction 20 is also substantially cylindrical.

The valve 10 includes a flow diverter 22 located within the interior of the main junction 20 of the body 12 between the inlet 14 and the outlets 16, 18. The flow diverter 22 includes a tubular side wall 24 defining an interior. The outer surface of the side wall 24 of flow diverter 22 is substantially cylindrical to provide for sliding receipt of the flow diverter 22 within the interior of the main junction 20 of valve body 12. The sliding receipt of the flow diverter 22 in this manner provides for rotation of the flow diverter 22 with respect to the valve body 12 about a central axis of the flow diverter 22.

The valve 10 includes a motor 26 having an output shaft 28 engaging the flow diverter 22 for drivingly rotating the flow diverter 22 with respect to the valve body 12. In the illustrated embodiment, the flow diverter 22 includes an end wall 30 connected to the side wall 24 of the flow diverter 22 at one end of the side wall 24. The flow diverter 22 also includes a socket 32 on the end wall 30 extending from a surface of the end wall 30 opposite the interior of the flow diverter 22. As shown in FIG. 1, the socket 32 is adapted to receive an end portion of the motor output shaft 28. To facilitate engagement, and transfer of torque, between the motor 26 and the flow diverter 22, the socket 32 and the end portion of the output shaft 28 can include flattened surfaces (e.g., a hex-head, non-circular, triangular or flat configurations).

Referring to FIG. 2, the first and second outlets 16, 18 are spaced apart from each other on the main junction 20 such that an angle, $\theta_A$, defined between central axes of the outlets 16, 18 is equal to approximately 150 degrees. The inlet 14 of the illustrated valve 10 is spaced between the outlets 16, 18 on the main junction 20 such that angles, $\theta_B$ and $\theta_C$, defined between the inlet 14 and the first and second outlets 16, 18, respectively, are each equal to approximately 105 degrees. An opening 34 is defined in the side wall 24 of the flow diverter 22 extending around approximately one-half (i.e., 180 degrees) of the circumference of the tubular side wall 24. The opening 34 is located along the length of the side wall 24 of the flow diverter 22 to position the opening 34 adjacent the location of the inlet 14 and the outlets 16, 18 on the main junction 20.

Arranged in this manner, the opening 34 in the flow diverter 22 is adapted to provide communication between the inlet 14 and either one of the first and second outlets 16, 18 as follows. The flow diverter 22 is shown in FIG. 2 in a first flow position. In the first flow position, the flow diverter 22 is oriented rotationally with respect to the valve body 12 such that the opening 34 provides communication between the first outlet 16 and the interior of the flow diverter 22. As shown, the opening 34 in the first flow position also provides communication between the inlet 14 and the interior of the flow diverter 22. As a result, a flow of a fluid directed into the interior of valve body 12 will be directed in the first flow position into the first outlet 16 via the interior of the flow diverter 22 as illustrated by the flow arrow in FIG. 2. As shown, the tubular side wall 24 of flow diverter 22 functions to close the second outlet 18 from the interior of the main junction 20 in the first flow position, thereby preventing fluid from being directed into the second outlet 18. Those skilled in the art will readily understand that a counter-clockwise rotation of the flow diverter 22 (from the point of view shown in FIG. 2) by an angle equal to approximately $\theta_A$ (e.g., approximately 150 degrees) will position the flow diverter 22 in a second flow position in which the fluid is directed from the inlet 14 into the second outlet 18. In a similar manner as the second outlet 18 in the first flow position, the flow diverter 22 will function to close the first outlet 16 from the interior of the main junction 20 in the second flow position such that flow of the fluid into the first outlet 16 is prevented.

The motor 26 is preferably adapted to provide two-way travel of the flow diverter 22 between the first and second flow positions. According to a presently preferred embodiment, the motor 26 is a stepper motor and the valve 10 includes travel stops (not shown) for limiting the rotational travel of the flow diverter 22 between the first and second flow positions. Such a construction provides for the use of a simple torque-limited stepper motor for driving the flow diverter 22. The valve of the present invention is not limited to stepper motor and could include other types of motive force (e.g., DC motor, solenoid, hydraulic, or mechanical force) for driving the flow diverter. The use of a DC motor or a hydraulic or mechanical force for driving the flow diverter would be desirable for higher capacity valves (e.g., valves having capacity greater than approximately 200 gallons per minute).

The valve 10 includes a mounting plate 36 at one end of the main junction 20 of the valve body 12. The mounting plate 36 is adapted to receive fasteners 38 for securing the valve body 12 to a housing of the motor 26. The valve 10 also includes an annular flange 40 located at an end of the main junction 20 of valve body 12 opposite the mounting plate 36. As shown in FIG. 1, the flange 40 defines a recessed shoulder on an inner surface for receiving a closure plate 42 to enclose the flow diverter 22 within the interior of the main junction 20. The flange 40 and the closure plate 42 facilitate placement of the flow diverter 22 into the interior of the valve body 12 during assembly of the valve 10.

For smaller capacity valves (e.g., capacity less than approximately 150 gals/minute), all components of the flow diverter and valve body can molded from a thermoplastic material (e.g., glass-filled nylon). This includes valves on most passenger cars having operating temperatures ranging between approximately 40 degrees Centigrade and approximately 130 degrees Centigrade. For valves used in HD diesel engines and for larger capacity valves, the flow diverter and valve body would both preferably be made from a metal (e.g., aluminum). The use of similar materials (e.g., all plastic or all metal) for the flow diverter and the valve body, desirably provides more uniform thermal expansion to help prevent sticking between the flow diverter and the valve body. The aluminum of the flow diverter 22 can be coated with a polytetrafluoroethylene material (e.g., Teflon®) to facilitate relative rotation between the flow diverter 22 and the valve body 12. The inclusion of a coating of polytetrafluorethylene on the diverter 22 would also help prevent sludge build-up on the diverter 22. For valves having a valve body made from a thermoplastic material, the closure plate 42 of valve body 12 is preferably secured to the flange 40 using a thermoplastic welding process (e.g., spin welding). It should be understood, however, that the present invention is not limited to any particular material such as aluminum or thermoplastics and that other materials (e.g., magnesium) could be used. Also, although preferred, it is not required that a similar material be used to form both the flow diverter and the valve body. It is conceived that the use of mixed materials could have application in special circumstances.

As shown in FIG. 1, the main junction 20 of valve body 12 and the flow diverter 22 are preferably dimensioned such that a controlled gap 44 is defined between the closure plate 42 and an end of the flow diverter 22.

The flow diverter 22 of valve 10 includes apertures 45 defined in the end wall 30 of the flow diverter 22. The apertures 45 in end wall 30 allow some of the fluid directed into the interior of the flow diverter 22 to pass through the end wall 30 into a space provided between the end wall 30 and the mounting plate 36. The receipt of fluid via apertures 45 serves to prevent a pressure imbalance that could otherwise develop on opposite sides of the end wall 30.

Although the flow diverter 22 has been described above as directing flow to either the first outlet 16 or the second outlet 18, it should be understood that the flow diverter 22 could be adapted to provide a position in which a flow of a fluid is split between the first and second outlets 16, 18.

Figure 3:
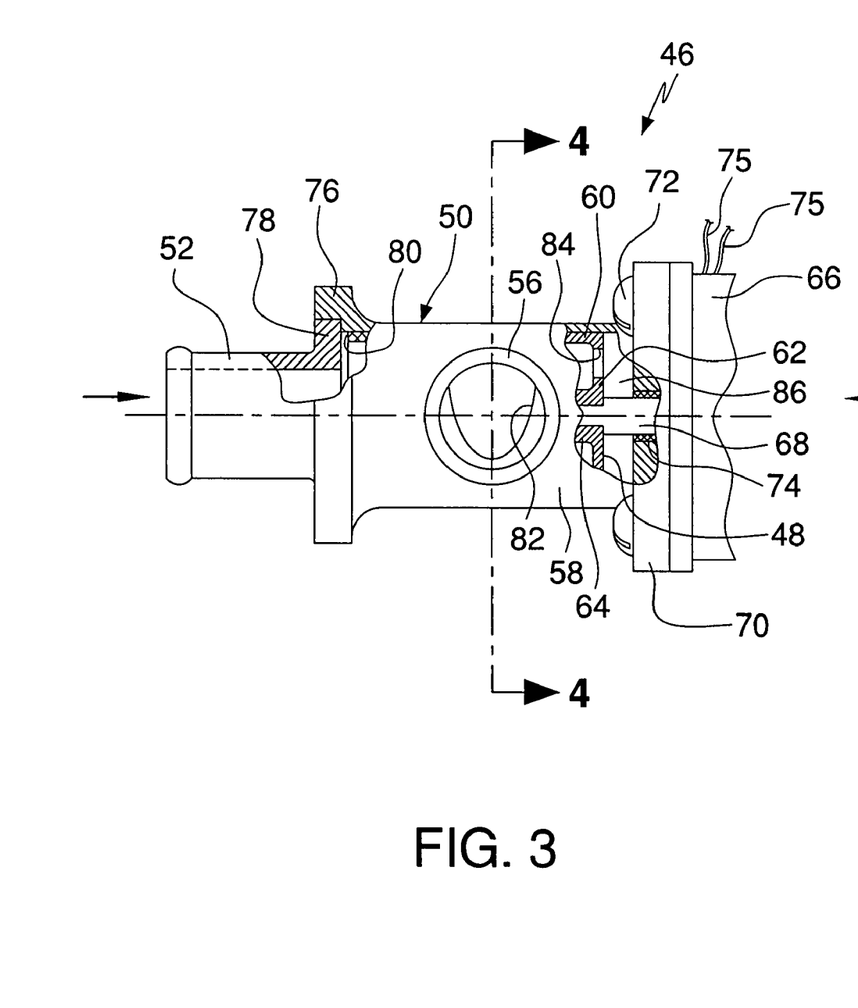
FIG. 3 is a side view, partly in section, of a valve according to a second exemplary embodiment of the invention.
Figure 4:
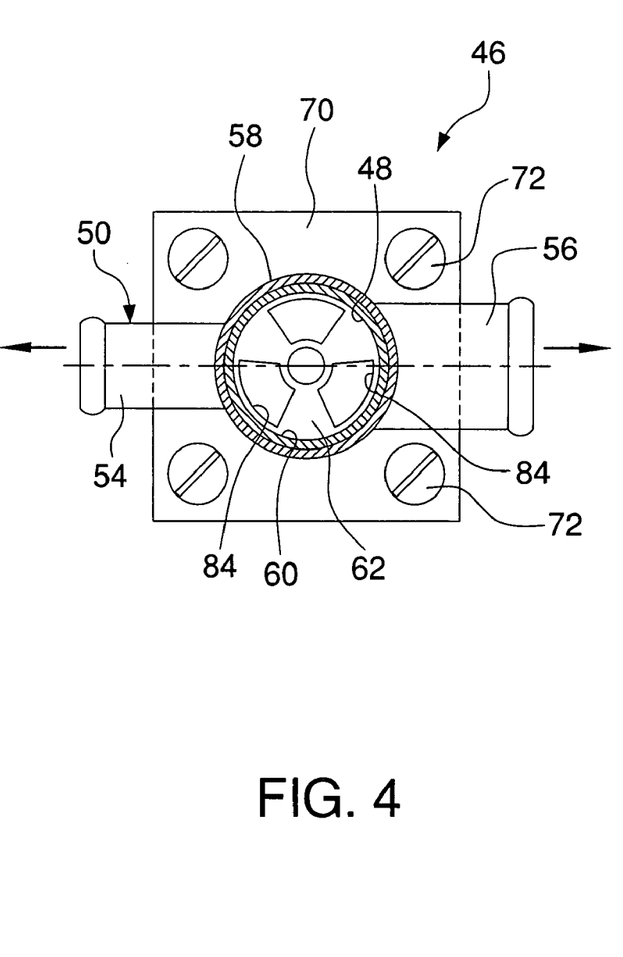
FIG. 4 is a section view of the valve of FIG. 3 taken along the line 4-4 in FIG. 3.
Figure 5:
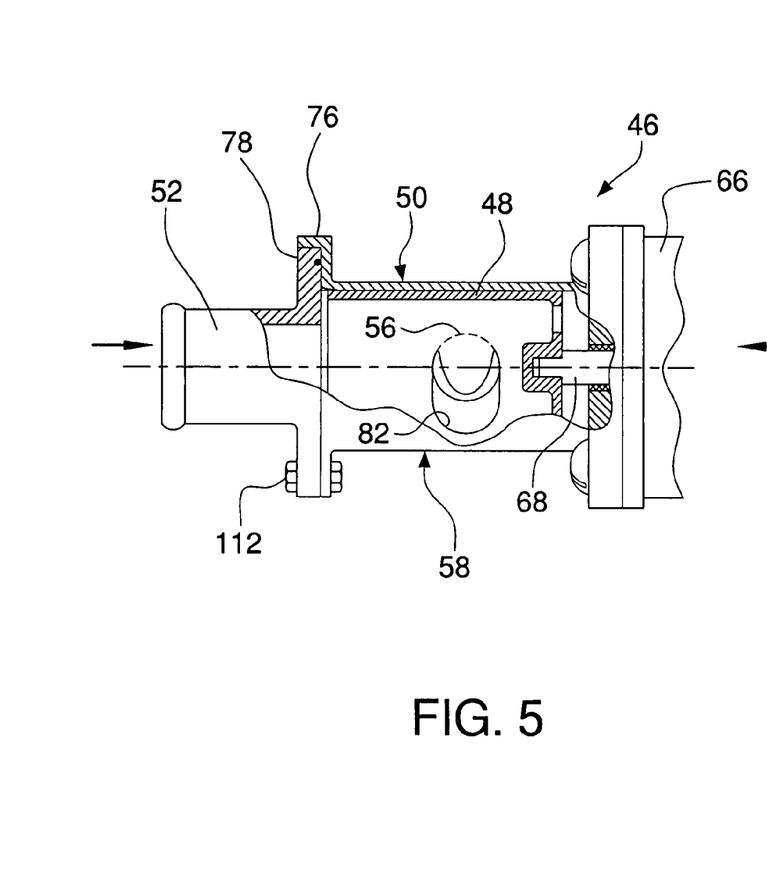
FIG. 5 is a side view of the valve of FIG. 3, illustrated partly in section showing a portion of the interior of a flow diverter of the valve.

In the above-described valve 10 the flow of fluid is directed into the interior of the flow diverter 22, and discharged from the interior of the flow diverter 22, through the opening 34 in the side wall 24. Thus, the fluid is directed in lateral directions (i.e., perpendicular to the central axis of the flow diverter 22) for both inlet and discharge. Referring to FIGS. 3 through 5, there is illustrated a valve 46 according to a second exemplary embodiment of the invention having a flow diverter 48 in which the fluid is turned 90 degrees, either axially to laterally with respect to the flow diverter 48, or alternatively laterally to axially, between the inlet and discharge of fluid.

The valve 46 includes a body 50 defining an interior and including an inlet 52 and first and second outlets 54, 56 that, similar to the inlets and outlets of valve 10 are substantially cylindrical. The valve body 50 also includes a substantially cylindrical main junction 58 located between the inlet 52 and the outlets 54, 56. The outlets 54, 56 extend laterally from the main junction 58 and are located on opposite sides of the main junction 58 of the illustrated valve 46. The inlet 52 is located at an end of the main junction 58 and is oriented such that a central axis of the inlet 52 is substantially parallel to, and aligned with, a central axis of the main junction 58. Although the valve 46 is shown and described as including inlet 46 and outlets 54, 56, the present invention is not so limited. It should be understood that the direction of flow could be reversed such that flow enters the valve 46 from a pair of "inlets" (e.g., elements 54, 56) for discharge via a single "outlet" (e.g., element 46).

The flow diverter 48, similar to the flow diverter 22 of valve 10, includes a tubular side wall 60 defining an interior and having an outer surface slidingly received by the main junction 58 for relative rotation between the flow diverter 48 and the valve body 50. Also similar to flow diverter 22 of valve 10, the flow diverter 48 includes an end wall 62 and a socket 64 engagingly receiving an output shaft 68 of a motor 66 for driven rotation of the flow diverter 48 by the motor 66. The socket 64 on flow diverter 48 extends inwardly with respect to the flow diverter 48, in contrast to the socket 32 of flow diverter 22 which extends in an outward direction from the end wall 30 of flow diverter 22. The valve 46 includes a mounting plate 70 at an end of the main junction 58 of valve body 50 receiving fasteners 72 to secure the valve body 50 to the motor 66. The valve 46 includes a bushing 74 received in an opening defined in the mounting plate 70 for rotatably supporting the output shaft 68 of motor 66. Also, in some applications a simple radial O-ring shaft seal (not shown) can be utilized. According to a presently preferred embodiment, the motor 66 is a stepper motor. As shown, the motor 66 can include dual motor leads 75 to provide protection against failure of the motor in the event that one of the leads becomes inoperative. Preferably, separation is provided between the leads 75 to limit the risk that an event causing severance of one of the motor leads 75 result in severance of both motor leads 75. It is also contemplated that in the event of a relatively high motor torque (e.g., a torque above a design range for motor 66) the valve 46 could be adapted to send an alert signal for service identifying a failure mode.

Similar to valve 10, the valve 46 includes a flange 76 located at an end of the main junction 58 opposite the mounting plate 70 and defining a recessed shoulder on an inner surface of the flange 76. The flange 76 on the main junction 58 is adapted to receive a flange 78 located at an end of the inlet 52 for connecting the inlet 52 to the main junction 58. The inlet 52 is preferably secured to the main junction 58 by welding the flanges 76, 78 to each other. According to one preferred embodiment, the valve body 50 is made from a thermoplastic material (e.g., glass-filled nylon) and the inlet 52 is secured to the main junction 58 using a thermoplastic welding process (e.g., spin welding).

The connection of the inlet 52 at the end of the main junction 58 in the above-described manner results in fluid being directed into the interior of the flow diverter 48 in an axial direction with respect to the flow diverter 48 through an open end 80 of the flow diverter 48. As shown in FIG. 3, at least one opening 82 is defined in the side wall 60 of the flow diverter 48 for discharging fluid to one of the outlets 54, 56 depending on the angular orientation of the flow diverter 48 with respect to the valve body 50. Preferably, the flow diverter 48 includes an opening on each of opposite sides of the side wall 60. As described below in greater detail, the use of a pair of openings in this manner limits the amount of rotation necessary to move the flow diverter 48 between first and second flow positions for respectively directing the flow to the first and second outlets 54, 56 of valve 46. As shown in the drawings and described below in greater detail in the description of FIGS. 6 and 7, the openings 82 are not circular in shape. Instead, the configuration of the openings 82 has been empirically developed to provide desired flow characteristics (e.g., to transition flow during initial opening of the valve to prevent "gulps" of cold coolant from entering an engine). The use of separate discharge openings also allows for differing configurations for the openings, as also described below, for more precise flow control (e.g., a first configuration for a radiator outlet versus a by-pass outlet).

The flow diverter 48 also includes apertures 84 defined in the end wall 62 of the flow diverter 48. The apertures 84 in end wall 62 allow some of the fluid directed into the interior of the flow diverter 48 via the inlet 52 to pass through the end wall 62 into a space 86 provided between the end wall 62 and the mounting plate 70. The receipt of fluid within the space 86 via apertures 84 serves to prevent a pressure imbalance that could otherwise develop on opposite sides of the end wall 62.

As illustrated in FIG. 4, the rotary valve 46 is configured such that the flow diverter 48, and the main junction 58 of body 50 in which the flow diverter 48 is housed, have substantially uniform wall thickness about the valve body 50. Uniformity in wall thickness in this manner facilitates precision molding of both mating components of the valve 46 to control all close tolerances features including roundness. Such precision facilitates dimensional stability under all operating conditions for the valve 46.

Referring to FIG. 5, the flanges 76, 78 of the valve body 50 of rotary valve 46 are adapted to receive fasteners 112 (e.g., nut and bolt connectors) in aligned openings for securing the inlet of the valve body 50 to the main junction 58. As shown in FIG. 5, the valve 46 preferably includes an O-ring face seal between the flanges 76, 78. As also shown in FIG. 5, a taper is preferably provided on the inner surface of the main junction 58 adjacent the flanges 76, 78 to facilitate assembly of the diverter 48 with the O-ring component.

The interior volume provided by the construction of the flow diverter 48 provides an ideal transition between the axially inlet flow of fluid to the radially discharged flow (or alternately, between a radially inlet flow and an axially discharged flow in a reversed flow application of the valve 46). Also, the rounded configuration of the rotary valve 46 of the present invention allows the valve to operate freely regardless of pressure differentials between various components of a fluid control system (e.g., between radiator, engine, by-pass, etc. of an engine coolant system) and without the need for extra torque or special balancing passageways as disclosed in U.S. Pat. Publ. 2006/0005789. The construction of the valve also provides space saving efficiencies for reduced package size.

Figure 6:
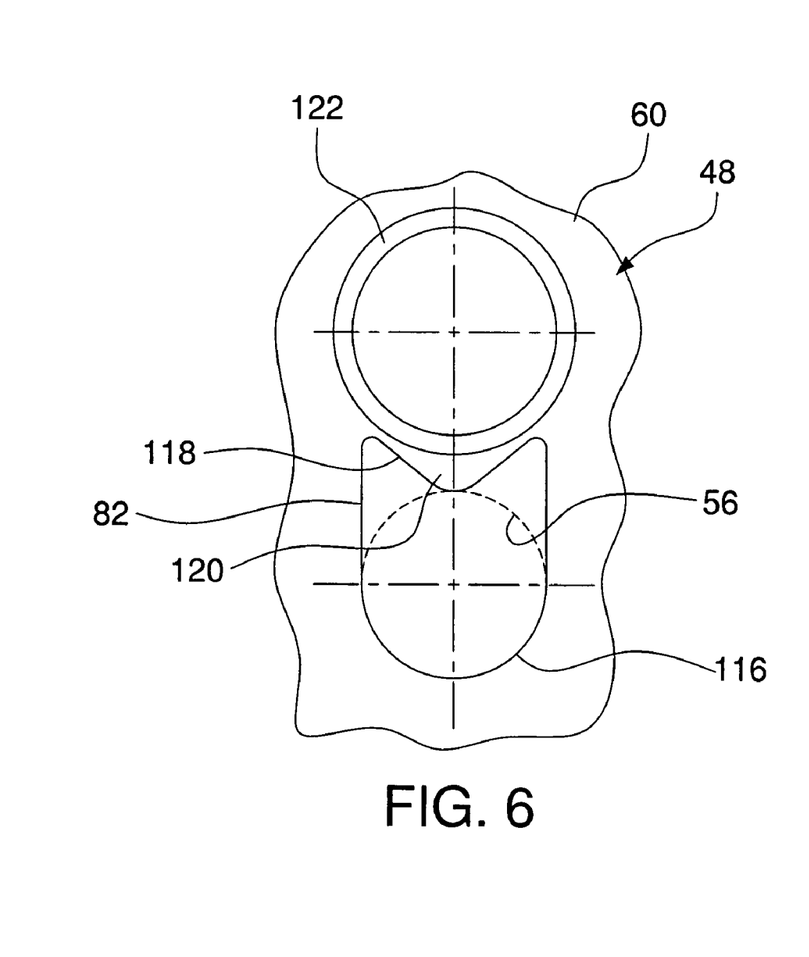
FIG. 6 is a flat layout illustration of a portion of the flow diverter of the valve of FIG. 3, the flow diverter shown in a full open position.
Figure 7:
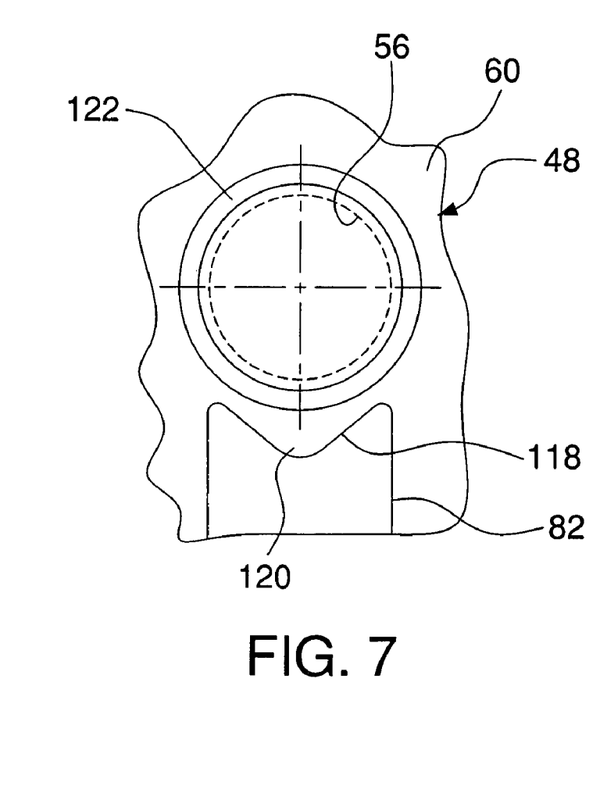
FIG. 7 is a flat layout illustration of the flow diverter of FIG. 6 shown in a full closed position.

Referring to FIGS. 6 and 7, a portion of the side wall 60 of flow diverter 48 of valve 46 is shown. The portion of the substantially cylindrical side wall 60 has been illustrated in FIGS. 6 and 7 in a flat layout form to facilitate description. The flow diverter 48 is respectively shown in full open and full closed positions in FIGS. 6 and 7. The inner diameter of the associated outlet 56 is shown in dotted line in FIGS. 6 and 7 to illustrate the relative positions between the opening 82 in the figures to illustrate the relative positions between the opening 82 and the outlet 56 in the full open and full closed flow positions. As described above, the flow diverter 48 preferably includes a second opening (not shown) on an opposite side of the flow diverter 48. As understood by one skilled in the art, the inclusion of two openings in this manner limits the amount of rotation necessary to move the flow diverter between first and second flow positions in which fluid is directed to the first and second outlets 54, 56, respectively.

The opening 82 in the flow diverter side wall 60 includes a rounded end 116 at one end of the opening 82. As shown, the rounded end 116 has a radius that is substantially equal to that of the inner surface of the associated outlet 56. In this manner, the opening 82 is configured such that no portion of the flow diverter side wall 60 will block the outlet 56 in the full open position shown in FIG. 6 (i.e., there is complete communication between the interior of the flow diverter 48 and the interior of the outlet 56). The opening 82 is non-symmetrical including an opposite end 118 that is not circular in configuration. Instead, as shown, the edge of the flow diverter side wall 60 defining the opening 82 returns inwardly with respect to the opening 82 at the second end 118 such that a portion of the side wall 60 forms a tongue-like formation 120 projecting inwardly into the opening 82 at the second end 118. As should be understood by one skilled in the art, the inclusion of the tongue-like projection 120 at the second end 118 of opening 82 provides for controlled transition in the flow of fluid being directed from the flow diverter 48 to the associated outlet 56 as the flow diverter 48 is moved from the full open position towards the full closed position (i.e., downwardly in the point of view of FIG. 6). In addition to limiting necessary rotation between the first and second flow positions, the inclusion of separate openings on opposite sides of the flow diverter 48 allows for customization of the flow-controlling projection defined at the second end of the opening (e.g., differently configured projection for a radiator outlet of an automotive coolant system compared to that for a by-pass outlet).

The flow diverter 48 also defines a substantially circular O-ring groove 122 in an outer surface of the side wall 60 adapted for receiving an O-ring seal (not shown). As shown in FIG. 7, the groove 122 is located with respect to the opening 82 to position the groove 122 in a substantially concentric relationship with the associated outlet 56 in the full closed condition to provide a closure seal between the diverter 48 and the outlet 56. It should be understood that the O-ring feature could be included on any of the various embodiments of the rotary valve of the present invention.

Figure 8:
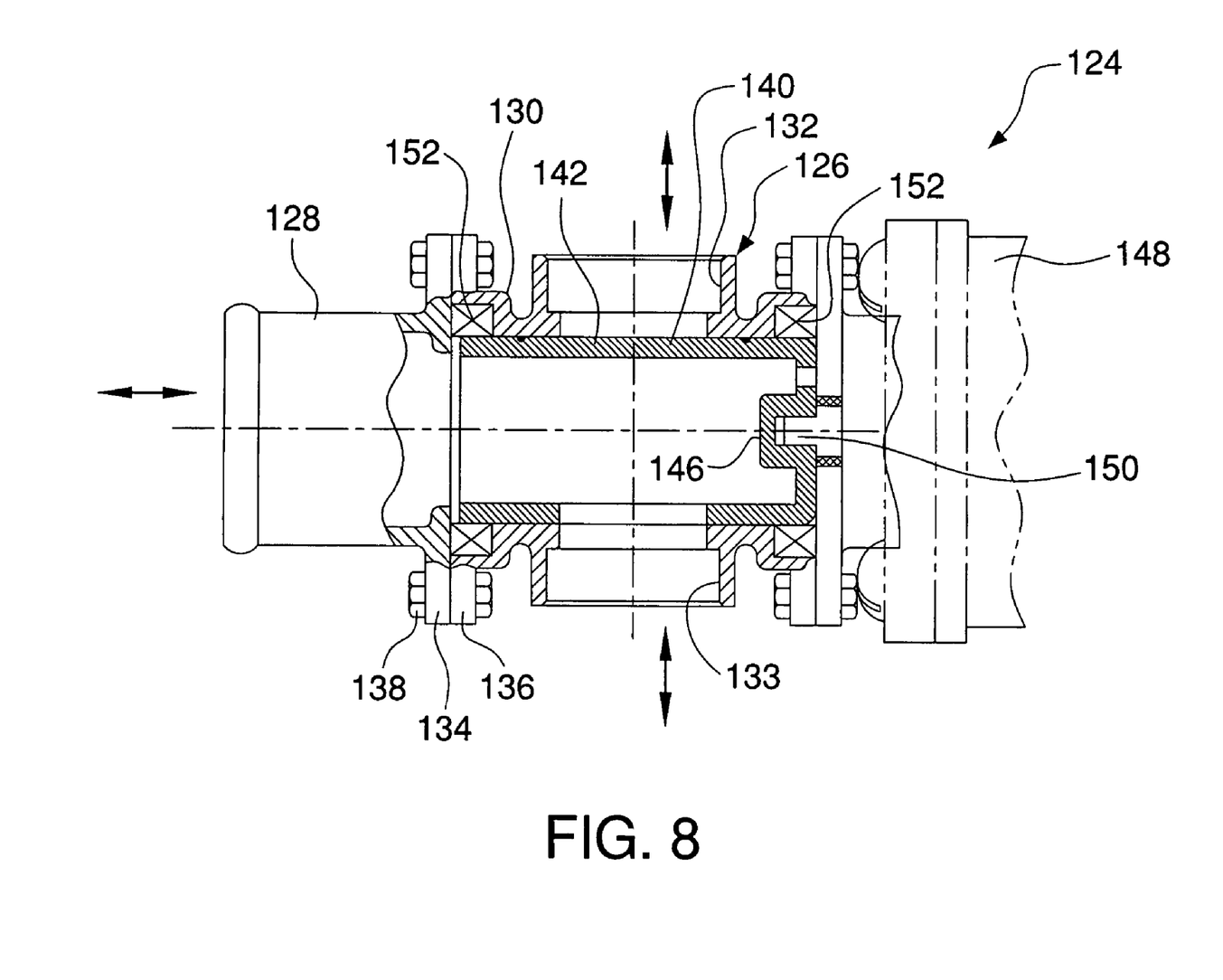
FIG. 8 is side view, partly in section, of a valve according to a third exemplary embodiment of the invention.

Referring to FIG. 8, there is shown a valve 124 according to a third exemplary embodiment of the invention. The valve 124 is adapted for relatively larger flow capacity compared to the valve 46. The valve 124 includes a body 126 including and inlet 128 connected to a main junction 130 at an end of the main junction 130. The body 126 also includes a pair of outlets 132, 133 connected in transverse manner to the main junction 130 similar to the outlets 54, 56 of valve 46 for example. In a similar manner as valve 46, the inlet 128 and the main junction 130 respectively include flanges 134, 136 adapted for receiving fasteners 138 (e.g., nut and bolt connectors) for securing the inlet 128 to the main junction 130.

The valve 124 includes a flow diverter 140 rotatably received within an interior of the main junction 130. The flow diverter 140 includes a substantially cylindrical side wall 142 and an end wall 144 defining a socket 146 for receiving an output shaft 150 of a drive motor 148. It should be understood that the flow diverter 140 includes openings (not shown) in the side wall 142 of the flow diverter as described above to provide for respectively opening and closing the outlets of the valve 124 to fluid from the interior of the diverter 140. To facilitate rotatable support of the flow diverter 140 within the valve body 126, the valve 124 includes a pair of watertight bearings 152 located at opposite ends of the flow diverter 140 within housing portions of the main junction 130. An intermediate area of the valve 124 located between the bearings 152 is sized to minimize friction. According to a presently preferred embodiment, the valve body 126 and the flow diverter 140 are both made from aluminum. The flow diverter 140 can be coated with polytetrafluoroethylene to further limit friction between the flow diverter 140 and the valve body 126.

As shown in FIG. 8, the valve 124 includes an O-ring seal located between the outer surface of the flow diverter 140 and the interior of the main junction 130 adjacent the outlet 132 to provide a seal between the outer surface of the flow diverter 140 and the interior of the main junction 130.

Similar to the above-described valves 10, 46, the valve 124 includes a mounting plate at an end of the main junction 130 receiving fasteners to secure the valve body 126 to the motor 148 of valve 124. As discussed above, the flow diverter of each of the valves 10, 46, 124 also includes an end wall defining a socket engagingly receiving the output shaft of the motor. In addition to facilitating valve assembly, these construction features also facilitate subsequent access to interior components of the valves, thereby promoting serviceability of the valves (e.g., for repair or replacement of an interior component of the valve). This serviceability feature is particularly desirable in valves such as the higher capacity valve 124 providing ready access for servicing interior components of the valve 124 such as the watertight bearings 152. Regarding the desired serviceability feature, certain large capacity valves (e.g., capacity greater than approximately 400 gals/minute) are expected to incorporate preventive maintenance provisions due to the initial high purchase cost.

Figure 9:
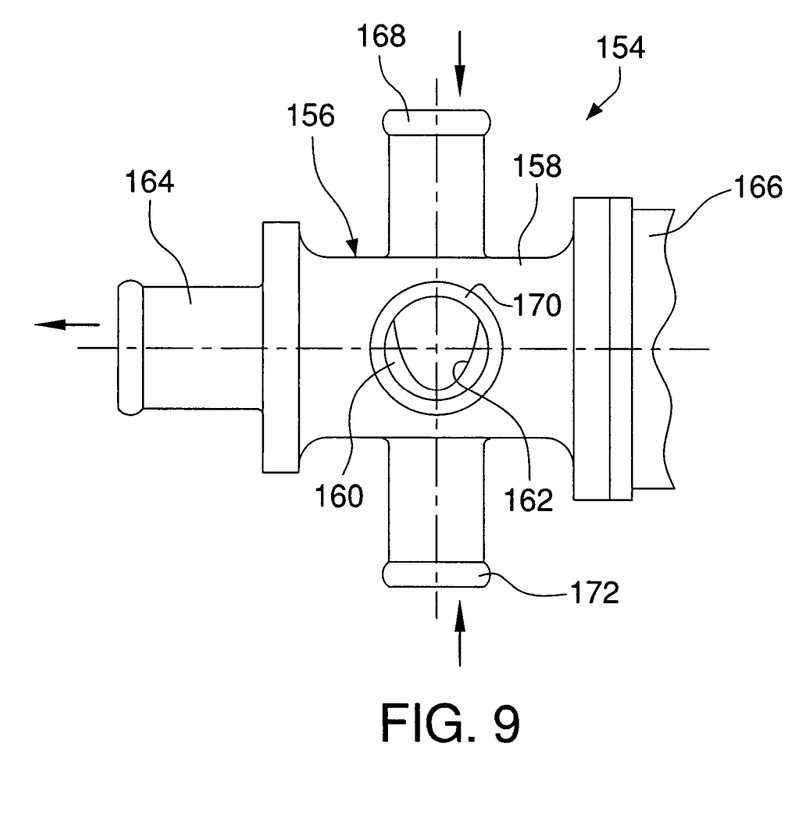
FIG. 9 is a side view of a valve according to a fourth exemplary embodiment of the invention.
Figure 10:
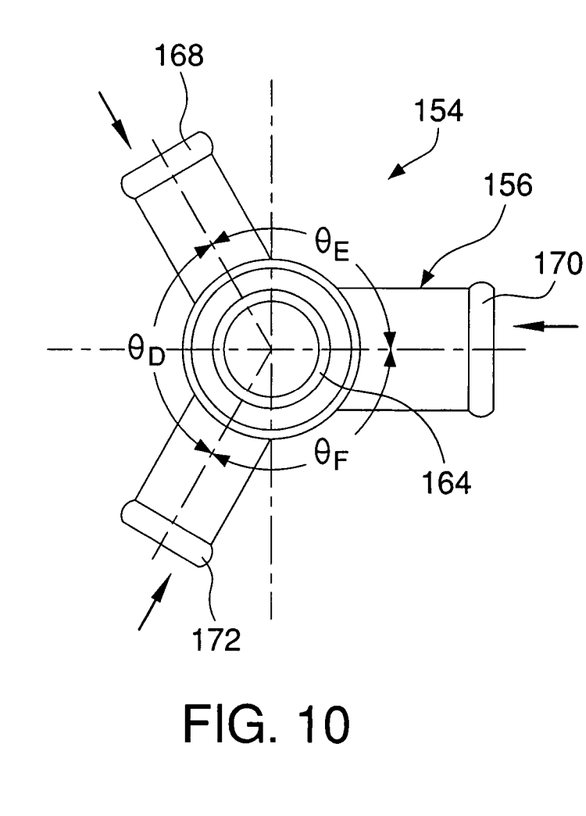
FIG. 10 is an end view of the valve of FIG. 9.

Each of valves 46, 124, described above, includes a single inlet and a plurality of outlets adapted for receiving a fluid from the inlet via an intermediately located flow diverter. The present invention, however, is not so limited. Referring to FIGS. 9 and 10, there is shown a valve 154 according to a fourth exemplary embodiment of the invention. The valve 154 includes a body 156 including a substantially cylindrical main junction 158 and a flow diverter 160 rotatably received within an interior of the main junction 158 in the above described manner and having openings 162 in a side wall of the flow diverter. The valve body 156 of valve 154 includes an outlet 164 located at an end of the main junction 158 in an axially aligned manner similar to the inlet 52 of valve 46 for example. However, instead of directing fluid into the flow diverter 160, the outlet 164 receives fluid from the flow diverter 160 as indicated by the flow arrow in FIG. 9. The valve 154 includes a motor 166 to which the main junction 158 of body 156 is secured in the above-described manner for valves 46, 124.

The valve body 156 includes first, second and third inlets 168, 170, 172 each connected to the main junction 158 in transverse fashion for directing a fluid into the interior of the flow diverter 160 through the openings 162 of the diverter 160. The inlets 168, 170, 172 are spaced about the main junction 158 such that angles, $\theta_D$, $\theta_E$, $\theta_F$, are respectively defined between the first and third inlets 168, 172, between the first and second inlets 168, 170 and between the second and third inlets 170, 172. The angles, $\theta_D$, $\theta_E$, $\theta_F$, are respectively equal to approximately 100 degrees, 130 degrees, and 130 degrees, respectively, in the depicted embodiment.

According to one embodiment, the valve 154 could be adapted to direct coolant fluid in an automotive engine and the inlets 168, 170, 172 could respectively receive coolant fluid from an engine bypass line, from the radiator, and from the transmission (or engine oil pan) to direct the coolant fluid to a coolant pump via the outlet 164. This valve concept is illustrated in the layout drawing of FIG. 18. The bypass line 168 and the radiator inlet line 170 maintain the same open and close features as explained above for valve 46 of FIGS. 3 through 5. However, the transmission line 172 is designed to always remain opened. This allows for the cooling of the transmission fluid during hot conditions and the heating of the transmission fluid during cold conditions.

Figure 11:
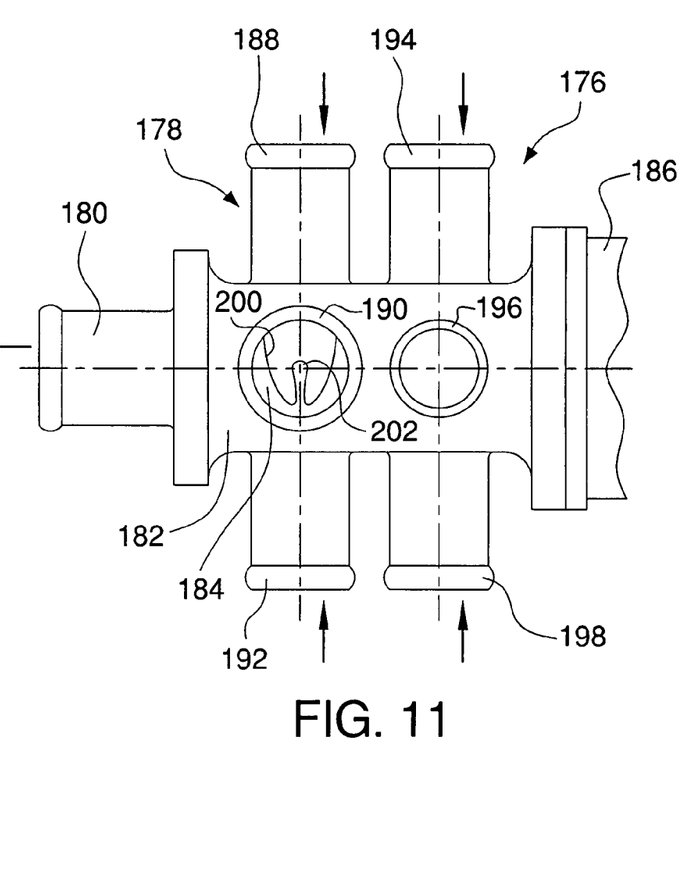
FIG. 11 is side view of a valve according to a fifth exemplary embodiment of the invention.

Referring to FIG. 11, there is shown a valve 176 according to a fifth exemplary embodiment of the invention. Similar to valve 154, the valve 176 includes a body 178 having a single outlet 180 connected to an end of a main junction 182 in an axially aligned manner and a flow diverter 184 rotatably received in an interior of the main junction 182. The main junction 182 is secured to a motor 186 at an end of the main junction 182 opposite the outlet 180.

The valve body 178 includes a plurality of inlets arranged in two groups of inlets each including three inlets. The inlets of the first group include first, second and third inlets 188, 190, 192 and the inlets of the second group include fourth, fifth and sixth inlets 194, 196, 198. The first group of inlets 188, 190, 192 is spaced about the main junction 182 at a first axial location of the main junction 182 and the second group of inlets 194, 196, 198 is spaced about the main junction 182 at a second axial location of the main junction 182. In the above-described manner, the flow diverter 184 of valve 176 includes openings, such as opening 200 for inlet 190, for directing fluid into the interior of the flow diverter 184 from the inlets. As shown, the opening 200 includes a flow-controlling tongue 202. In an automotive application, the inlets 188, 190, 192, 194, 196, 198 could respectively be arranged to receive a coolant fluid from transmission, radiator, bypass line, exhaust gas recirculation (EGR), charge air cooler (CAC), and rear axle.

Figure 12:
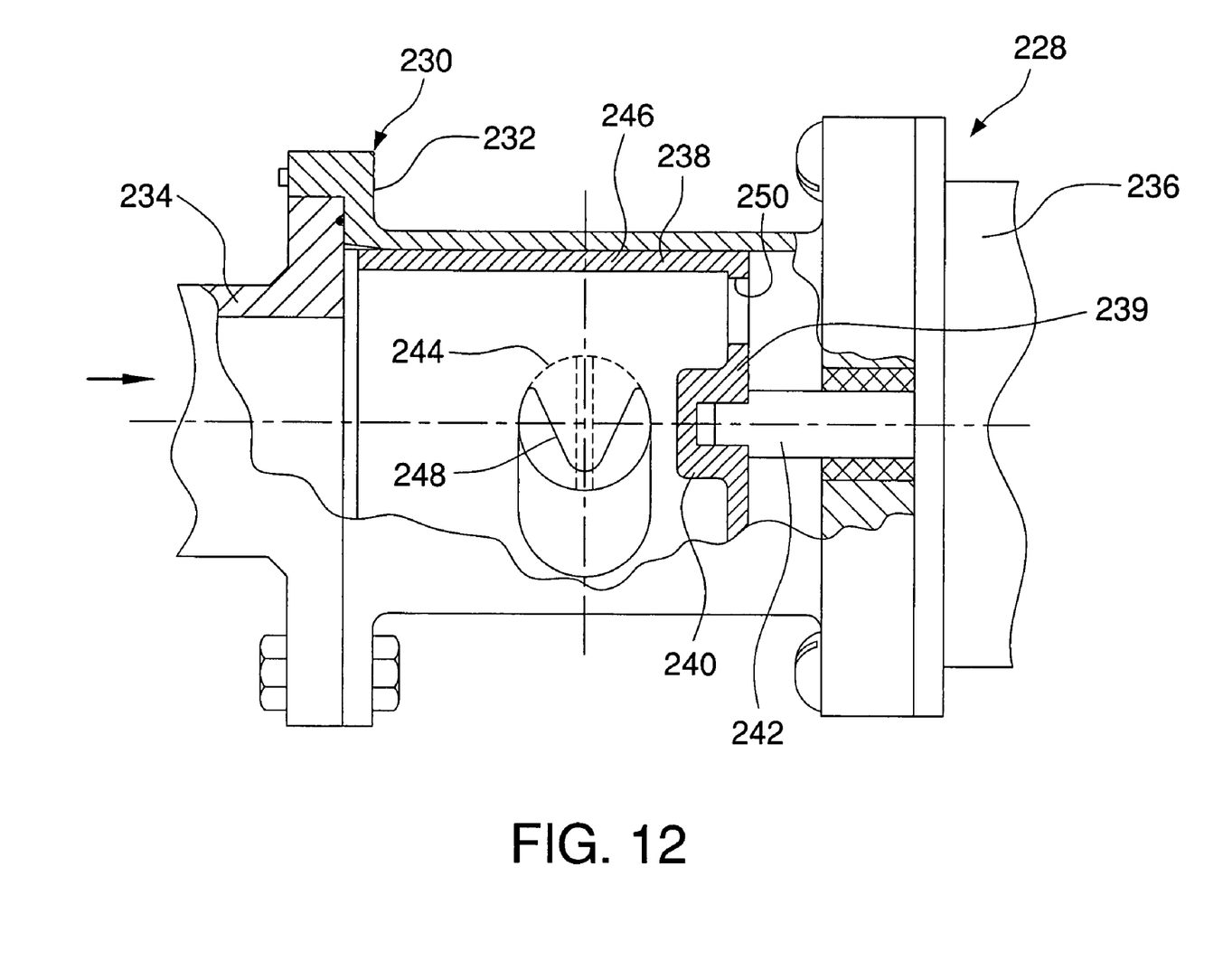
FIG. 12 is a side view, partly in section, of a valve according to an sixth exemplary embodiment of the invention.

Referring to FIG. 12, there is shown a valve 228 according to a sixth exemplary embodiment of the invention. The valve 228 includes a body 230 having a main junction 232 and an inlet 234 secured to an end of the main junction 232 in an axially aligned manner. The main junction 232 is secured to a motor 236 at an end of the main junction 232 opposite the inlet 234. A flow diverter 238 is rotatably received in an interior of the main junction 232 and includes an end wall 239 defining a socket formation 240 engagingly receiving an output shaft 242 of motor 236 for drivingly rotating the flow diverter 238. The valve body 230 also includes outlets, such as outlet 244, extending transversely from the main junction 232. The flow diverter 238 includes a side wall 246 having openings, such as opening 248, for directing fluid to one of the outlets, such as outlet 244, from the inlet 234 via an interior of the flow diverter 238. The flow diverter 238 also includes apertures 250 defined by the end wall 239 to provide for balanced pressure on opposite sides of the end wall 239. As discussed with respect to some of the other embodiments, this embodiment also includes the taper in the main junction 232 to facilitate assembly, as well as the O-ring component. Although these features are optional, they are preferred.

Figure 13:
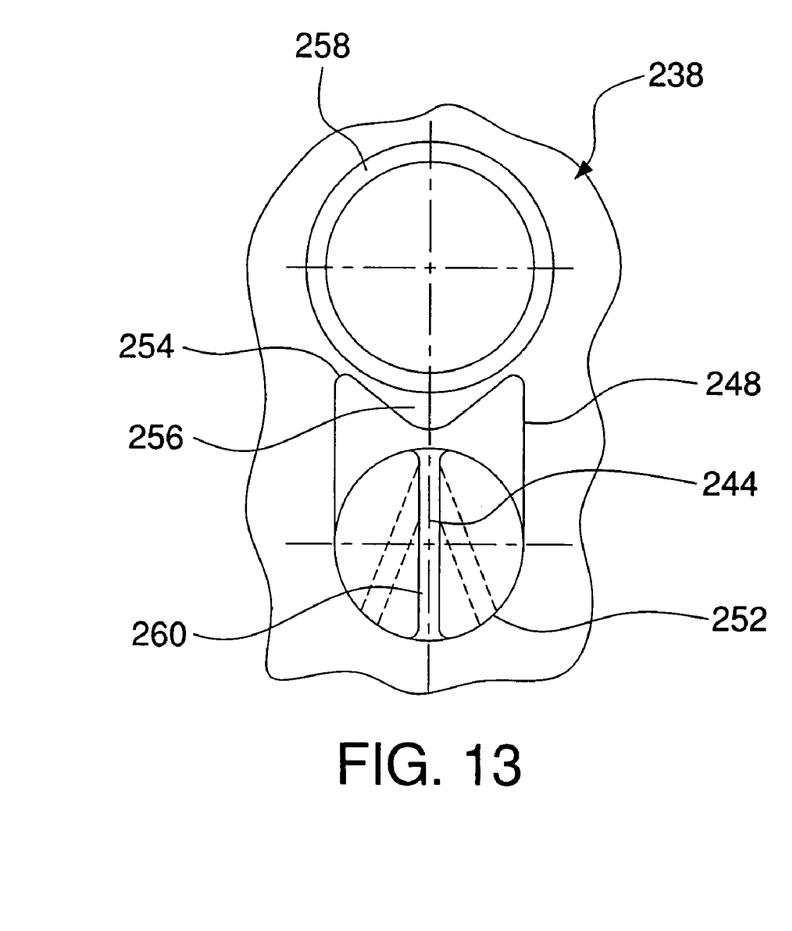
FIG. 13 is a flat layout illustration of a portion of the flow diverter of the valve of FIG. 12, the flow diverter illustrated in a full open position.
Figure 14:
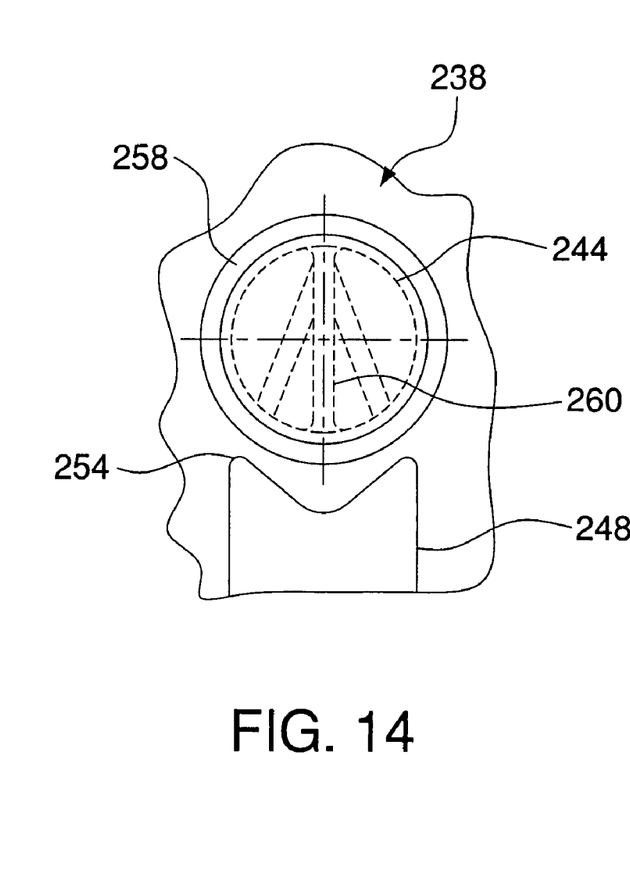
FIG. 14 is a flat layout illustration of the flow diverter of FIG. 13 shown in a full closed position.

Referring to FIGS. 13 and 14, a portion of the outer surface of the flow diverter 238 is shown in flat layout in full open and full closed positions, respectively. Similar to valve 46, the opening 248 in flow diverter 238 of valve 228 includes a rounded first end 252 having a radius substantially matching that of the outlet 244 and an opposite second end 254 forming a flow controlling tongue 256. Also similar to valve 46, the flow diverter 238 of valve 228 defines a circular groove 258 for receiving an annular O-ring for creating a seal between the flow diverter 238 and the outlet 244 when the flow diverter is moved to the full closed position for outlet 244 shown in FIG. 14. The valve body 230 also includes a reinforcing web 260 extending across an interior of the outlet 244 adjacent the flow diverter 238. The web 260 provides reinforcing support for an O-ring located at the intersection between the outlet 244 and the main junction 232. This support prevents sagging of the O-ring that might otherwise occur when the O-ring is heated. For relatively larger flow capacity valves (e.g., capacity greater than approximately 200 gals/minute) additional webs may be desired, for example two webs arranged in an inverted V-shaped configuration as shown in broken line in FIGS. 13 and 14.

Figure 15:
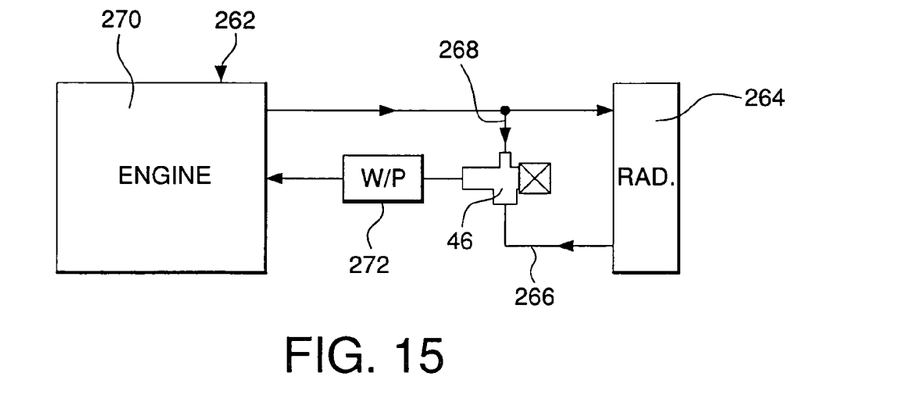
FIGS. 15 and 16 are schematic illustrations of engine coolant systems incorporating the valve of FIGS. 3 through 5.

Referring to the schematic illustration of FIG. 15, there is shown an engine coolant system 262 incorporating the rotary valve 46 of FIGS. 3 through 5. As illustrated by the flow arrows, engine coolant fluid is directed to the valve 46 in system 262 from a radiator 264 via line 266 and from a bypass line 268. The coolant fluid is outlet from the valve 46 to engine 270 via a water pump 272.

Figure 16:
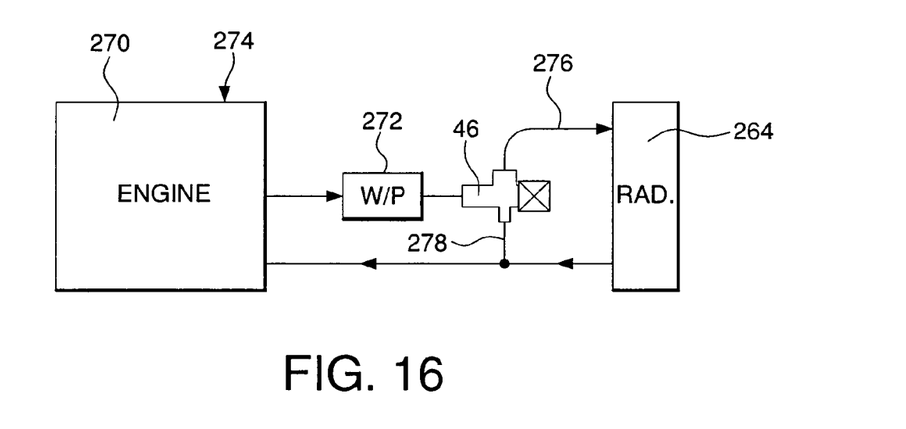

Referring to the schematic illustration of FIG. 16, there is shown another engine coolant system 274 incorporating the valve 46 of FIGS. 3 through 5. As shown, system 274 is arranged such that engine coolant fluid is directed from the engine 270 to the valve 46 via the water pump 272. Depending on the rotational position of the valve 46, the engine coolant is outlet from the valve 46 either to the radiator 264 via line 276 or returned to the engine 270 via bypass line 278.

Figure 17:
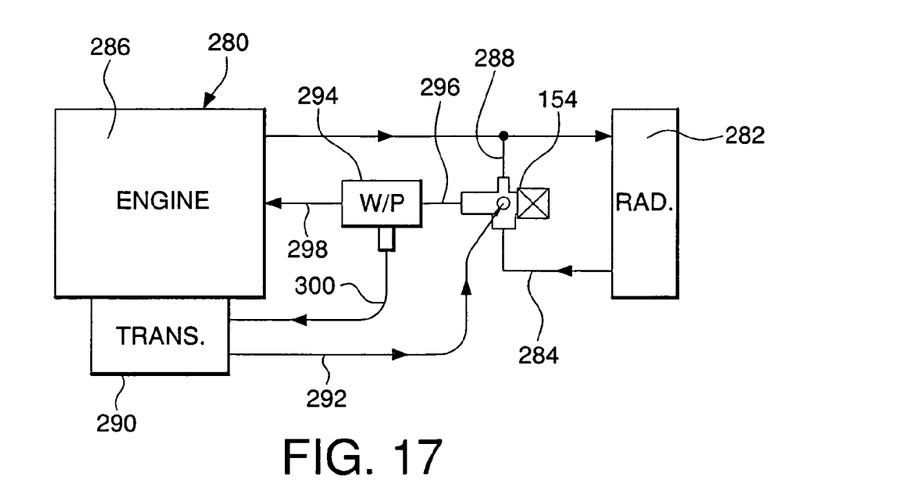
FIG. 17 is a schematic illustration of an engine coolant system incorporating the valve of FIGS. 9 and 10.

Referring to FIG. 17, there is illustrated an engine coolant system 280 incorporating the valve 154 of FIGS. 9 and 10. The system 280 is arranged such that engine coolant is inlet to the valve 154 from radiator 282 via line 284, from the engine 286 via radiator bypass line 288, or from transmission 290 via line 292. The engine coolant fluid is outlet from the valve 154 to a water pump 294 via line 296. From the water pump 294, the engine coolant is respectively directed to the engine 286 and the transmission 290 via lines 298, 300.

The inlet to the valve 154 of system 280 from the transmission 290 preferably always remains opened. This arrangement allows bypass flow to heat the transmission 290 during cold weather conditions and to direct colder radiator flow during relatively hot conditions. As should be understood, the engine coolant could alternatively be directed to another feature of an automobile rather than the transmission 290.

Figure 18:
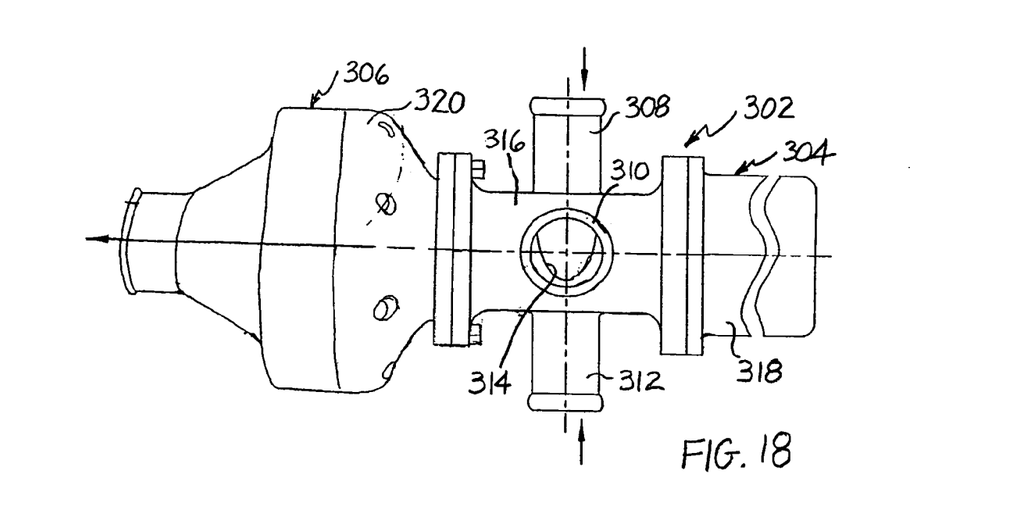
FIG. 18 illustrates the rotary valve in combination with an electronic water pump.

Referring to FIG. 18, there is shown a portion of an engine coolant system 302 including an integral rotary valve 304 and electronic water pump 306. The electronic water pump 306 is described in greater detail in U.S. Pat. No. 6,499,442, which is incorporated herein by reference in its entirety. The rotary valve 304, like rotary valve 154 of FIGS. 9 and 10, includes inlets 308, 310, 312 directing a fluid to a flow diverter 314 rotatably received in an interior of a main junction 316. A motor 318 includes a housing secured to one end of the main junction 316. The valve 304 lacks the outlet pipe that was included in the valve 154 of FIGS. 9 and 10. Instead, a housing 320 of the electronic water pump 306 is secured directly to the main junction 316 of the valve 304 opposite the motor 318.

Figure 19:
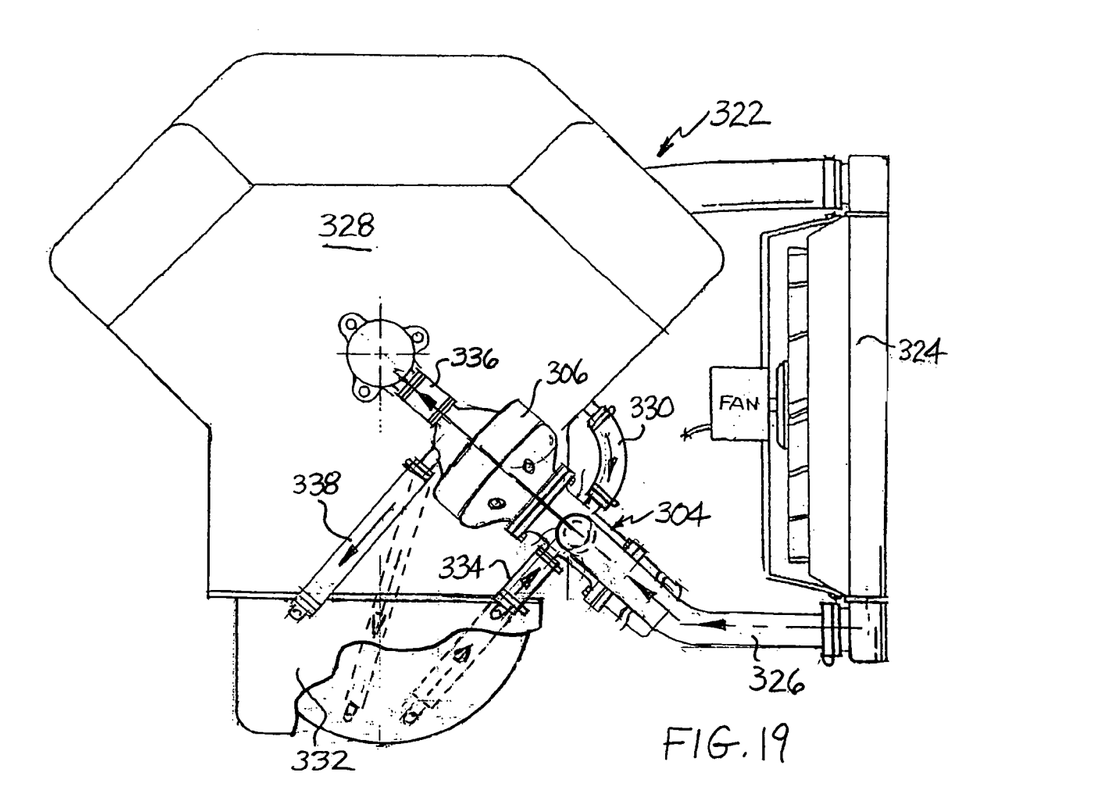
FIG. 19 illustrates the rotary valve/water pump combination of FIG. 18 mounted to an engine.

Referring to FIG. 19, there is illustrated a coolant system 322 for an automobile engine incorporating the integral valve 304 and water pump 306 assembly of FIG. 18. The coolant is directed into the valve 304 in system 322 from radiator 324 via line 326, from the engine 328 via a radiator bypass line 330, and from an oil pan 332 via line 334. The fluid is output from the valve 304 to the integral water pump 306 and, from there, is directed to the engine 328 via line 336 and to the oil pan 332 via line 338. In terms of the coolant flow distribution, the system 322 is arranged substantially similar to the system 280 shown in FIG. 17, except that the coolant is directed from the water pump 306 to the oil pan 332 instead of the transmission of the automobile. It should be understood that the coolant line could conceivably be directed to any suitable component of the automobile for conditioning by the coolant system. As was the case for the valve inlet from the transmission of system 280, the valve inlet from the oil pan 332 in system 322 is preferably maintained in an opened condition. Some small engines, such as hybrid engines, might incorporate a Y connection to combine both transmission and oil pan cooling in a single electronic-water pump and electronic control valve.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A valve for controlling flow of coolant through a coolant system in a vehicle, the valve comprising:
    a substantially cylindrical valve body having an inlet passageway and at least two substantially circular discharge passageways including a first discharge passageway and a second discharge passageway;
    a substantially tubular flow diverter disposed within the body for receiving a flow of coolant from the inlet passageway in an inlet direction and for discharging the flow of coolant into one or the other of the first and second discharge passageways in a discharge direction that is different from the inlet direction, the flow diverter having a substantially cylindrical wall, an open end, and an end wall opposite the open end,
    the flow diverter being rotatable about a central axis with respect to the body to direct at least a portion of the flow of coolant to one or the other of the first and second discharge passageways, the flow diverter preventing flow from being simultaneously directed to both the first and second discharge passageways,
    the flow diverter including an asymmetric discharge opening bounded by a first edge having a radius of curvature substantially matching the radius of curvature of one or the other of the discharge passageways, a pair of substantially parallel second edges extending from the first edge, and a third edge projecting inwardly into the opening between the second edges, the third edge providing for faster opening and slower closing of the one or the other discharge passageway than a substantially circular edge as the flow diverter is rotated to cause the third edge to pass across the one or the other discharge passageway; and
    a motor coupled to the flow diverter for drivingly rotating the flow diverter with respect to the body, an output shaft of the motor being received into a blind socket in the end wall of the flow diverter.

2. The valve according to claim 1, the end wall having at least one aperture providing a pressure balance between the inlet and discharge passageways.

3. The valve according to claim 1, further comprising a mounting plate located at an end of the substantially cylindrical the body, the mounting plate being adapted to receive a plurality of fasteners for removeably attaching the valve body to the motor to facilitate removal of the valve body from the motor thereby providing access to the valve interior for repair or replacement of a valve component.

4. The valve according to claim 3, wherein the body of the valve includes a flange located at an end of the main junction opposite the mounting plate, the flange defining a recessed shoulder on an inner surface of the flange, the body further including a closure plate received by the recessed shoulder of the flange to enclose the flow diverter within the interior of the main junction of the body.

5. The valve according to claim 4, wherein the valve body is made from a plastic material and wherein the closure plate is secured to the flange of the body using a spin welding process.

6. The valve according to claim 1, further comprising a groove formed in an outer surface of the flow diverter and a seal member located within the groove and adapted to prevent leakage between the flow diverter and the valve body.

7. The valve according to claim 6, wherein at least one of the outlets includes at least one reinforcing web adjacent an end of the outlet to provide reinforcing support for the seal member.

8. The valve according to claim 6, wherein the groove formed in the outer surface of the flow diverter is substantially circular and wherein the seal member located within the groove is substantially circular.

9. The valve according to claim 1, wherein the flow diverter is rotatable between first and second flow positions, the passageways and the flow diverter arranged such that the flow diverter directs substantially all of the coolant flow from the inlet passageway into the first passageway when the flow diverter is in the first flow position and into the second passageway when the flow diverter is in the second flow position.

10. The valve according to claim 9, wherein the flow diverter includes a substantially cylindrical wall and defines a discharge opening extending around approximately one-half of a circumference of the cylindrical wall.

11. The valve according to claim 1 further comprising a pair of bearings located between the flow diverter and the body to facilitate rotatable support of the flow diverter with respect to the body.

12. A valve for controlling flow of coolant through a coolant system in a vehicle, the valve comprising:
   a body having an inlet passageway, a first substantially circular discharge passageway, and a second substantially circular discharge passageway, each of the first and second discharge passageways being aligned substantially perpendicularly to the inlet passageway; and
   a substantially tubular flow diverter disposed within the body for receiving a flow of coolant from the inlet passageway and for discharging the flow of coolant into one of the first discharge passageway and the second discharge passageway, the flow diverter being rotatable with respect to the body about an axis of rotation to direct the flow of coolant to one of the first and second discharge passageways, the flow diverter preventing flow from being simultaneously directed to both the first and second discharge passageways, the flow diverter having a substantially cylindrical wall with an axial length and an asymmetric hole formed in the wall with a size that is substantially less than the axial length of the wall, and an end wall with a blind socket for receiving a driven shaft of a motor, the hole being bounded by a first edge having a radius of curvature substantially matching the radius of curvature of one or the other of the discharge passageways, a pair of substantially parallel second edges extending from the first edge, and a third edge projecting inwardly into the opening between the second edges, the third edge providing for faster opening and slower closing of the one or the other discharge passageway than a substantially circular edge as the flow diverter is rotated to cause the third edge to pass across the one or the other discharge passageway.

13. The valve according to claim 12, wherein the inlet passageway is substantially parallel to the axis of rotation for the flow diverter.

14. The valve according to claim 12, wherein the third edge forms two substantially triangular opening portions symmetrically disposed about a generally triangular flow-controlling tongue that projects inwardly between the second edges into the hole in the flow diverter.

15. The valve according to claim 12, wherein the end wall has at least one aperture to provide a pressure balance between the inlet and discharge passageways.

16. The valve according to claim 12 further comprising a motor driven shaft coupled to the blind socket in the end wall of the flow diverter for rotating the flow diverter with respect to the body.

17. The valve according to claim 16, wherein the shaft includes a non-circular periphery engagingly received by the socket for torque transfer between the shaft and the flow diverter.

18. The valve according to claim 17, wherein the body includes a mounting plate at an end of the body for mounting the body to a support member.

19. The valve according to claim 18 further comprising a bushing mounted in the mounting plate, the bushing adapted to receive the shaft to facilitate relative rotation between the shaft and the body.

20. The valve according to claim 12, wherein the body includes a main junction defining an interior located between the inlet passageway and the discharge passageways, the flow diverter being rotatably received within the interior of the main junction.

21. A valve for controlling flow of coolant through a coolant system in a vehicle, the valve comprising:
   a body having an inlet passageway and two discharge passageways including a first substantially circular discharge passageway and a second substantially circular discharge passageway;
   a substantially tubular flow diverter disposed within the body for diverting a flow of coolant from the inlet passageway into one or the other of the first and second discharge passageways;
   the flow diverter being rotatable about a central axis between a first flow position and a second flow position with respect to the body such that
      when the flow diverter is in the first flow position, the flow diverter directs the coolant flow only into the first discharge passageway and substantially blocks flow into the second discharge passageway;
      when the flow diverter is in the first flow position, the flow diverter directs the coolant flow only into the second discharge passageway and substantially blocks flow into the first discharge passageway; and
      when the flow diverter is in neither the first flow position nor the second flow position, the coolant flow is not directed to either the first discharge passageway or the second discharge passageway;
   the flow diverter including an asymmetric discharge opening bounded by a first edge having a radius of curvature substantially matching the radius of curvature of one or the other of the discharge passageways, a pair of substantially parallel second edges extending from the first edge, and a third edge projecting inwardly into the opening between the second edges, the third edge providing for faster opening and slower closing of the one or the other discharge passageway than a substantially circular edge as the flow diverter is rotated to cause the third edge to pass across the one or the other discharge passageway; and
   a motor coupled to the flow diverter for drivingly rotating the flow diverter between the first and second flow positions with respect to the body, an output shaft of the motor being received into a blind socket in an end wall of the flow diverter.

22. A valve for controlling flow of coolant through a coolant system in a vehicle, the valve comprising:
   a valve housing having a tubular wall with a substantially cylindrical inner surface bounding an inner cavity and at least two substantially circular openings formed in the tubular wall, a passageway connected to each opening formed in the tubular wall, and a third passageway for permitting flow of coolant either into or out of the housing;

a tubular flow diverter rotatably disposed within the inner cavity in the housing, the flow diverter including a wall having a substantially cylindrical outer surface positioned adjacent to the inner surface of the housing, the wall having an inner surface which defines a diverter cavity, the flow diverter including at least one diverter opening formed through the wall for permitting flow between the diverter cavity and one of the two openings formed in the tubular wall of the housing depending on the rotational position of the diverter relative to the housing, the flow diverter preventing flow from being simultaneously directed to both the first and second discharge passageways, the flow diverter opening being bounded by a first edge having a radius of curvature substantially matching the radius of curvature of one or the other of the discharge passageways, a pair of substantially parallel second edges extending from the first edge, and a third edge projecting inwardly into the opening between the second edges, the third edge providing for faster opening and slower closing of the one or the other discharge passageway than a substantially circular edge as the flow diverter is rotated to cause the third edge to pass across the one or the other discharge passageway; and a motor coupled to the flow diverter for drivingly rotating the flow diverter with respect to the housing, an output shaft of the motor being received into a blind socket in an end wall of the flow diverter.

* * * * *